US009513152B1

(12) United States Patent
Holcomb

(10) Patent No.: US 9,513,152 B1
(45) Date of Patent: Dec. 6, 2016

(54) LIQUID LEVEL TRANSMITTER UTILIZING LOW COST, CAPACITIVE, ABSOLUTE ENCODERS

(75) Inventor: Samuel Dirk Holcomb, Flowery Branch, GA (US)

(73) Assignee: Varec, Inc., Norcross, GA (US)

( * ) Notice: Subject to any disclaimer, the term of this patent is extended or adjusted under 35 U.S.C. 154(b) by 766 days.

(21) Appl. No.: 13/483,528

(22) Filed: May 30, 2012

Related U.S. Application Data

(60) Provisional application No. 61/577,780, filed on Dec. 20, 2011.

(51) Int. Cl.
| G01F 23/30 | (2006.01) |
| G01F 23/00 | (2006.01) |
| G01F 23/44 | (2006.01) |
| G01D 5/241 | (2006.01) |
| G01F 23/74 | (2006.01) |

(52) U.S. Cl.
CPC ........... *G01F 23/00* (2013.01); *G01F 23/0069* (2013.01); *G01F 23/44* (2013.01); *G01D 5/2415* (2013.01); *G01F 23/74* (2013.01)

(58) Field of Classification Search
CPC ..... G01F 23/44; G01F 23/46; G01F 23/0023
USPC ..................................... 702/55; 73/313, 314
See application file for complete search history.

(56) References Cited

U.S. PATENT DOCUMENTS

| 3,320,805 | A | * | 5/1967 | Kahle | ....................... G01D 5/12 |
| | | | | | 340/870.17 |
| 3,855,585 | A | * | 12/1974 | Stout | ............................. 341/156 |
| 3,956,681 | A | | 5/1976 | Vail et al. | |
| 3,975,633 | A | | 8/1976 | Larkin | |
| 4,236,144 | A | | 11/1980 | Sunagawa | |
| 4,275,382 | A | | 6/1981 | Jannotta | |
| 4,342,996 | A | | 8/1982 | Jannotta | |
| 4,459,584 | A | | 7/1984 | Clarkson | |
| 4,782,451 | A | | 11/1988 | Mazzarella et al. | |
| 4,786,846 | A | | 11/1988 | Uchida | |
| 4,788,648 | A | | 11/1988 | Ferretti et al. | |
| 4,807,464 | A | | 2/1989 | Janotta | |
| 4,821,022 | A | | 4/1989 | Jannotta | |
| 4,838,249 | A | | 6/1989 | Jannotta | |
| 4,920,797 | A | | 5/1990 | Swartz et al. | |
| 4,924,700 | A | | 5/1990 | Habart | |

(Continued)

OTHER PUBLICATIONS

"2900 Float & Tape Transmitter: Installation and Operations Manual", 2006, Varec, Inc., pp. 1-136.

(Continued)

*Primary Examiner* — John Breene
*Assistant Examiner* — Christine Liao
(74) *Attorney, Agent, or Firm* — Dawn-Marie Bey; Bey & Cotropia PLLC

(57) ABSTRACT

A liquid level monitoring and transmission system includes a mechanical assembly in communication with the liquid in a container and a dual electronic encoder assembly in communication with the mechanical assembly for determining liquid level. The dual electronic encoder assembly includes a first encoder for encoding data indicative of fine level measurements and a second encoder for encoding data indicative of coarse level measurements. The system further includes at least one processor for controlling operation of the first and second encoders and for processing encoded data therefrom and a power control system.

18 Claims, 8 Drawing Sheets

(56) References Cited

U.S. PATENT DOCUMENTS

| | | | |
|---|---|---|---|
| 5,048,560 A | 9/1991 | Jannotta et al. | |
| 5,056,017 A | 10/1991 | McGarvey | |
| 5,065,013 A | 11/1991 | Taylor | |
| 5,091,716 A | 2/1992 | Nelson et al. | |
| 5,103,225 A | 4/1992 | Dolan et al. | |
| 5,104,056 A | 4/1992 | Jannotta et al. | |
| 5,136,883 A | 8/1992 | Jannotta | |
| 5,243,860 A * | 9/1993 | Habart | 73/291 |
| 5,297,423 A | 3/1994 | Keating et al. | |
| 5,432,711 A | 7/1995 | Jackson | |
| 5,487,300 A | 1/1996 | Brackett et al. | |
| 5,596,188 A | 1/1997 | McElroy | |
| 5,627,523 A | 5/1997 | Besprozvanny et al. | |
| 5,655,403 A | 8/1997 | Topliff | |
| 5,655,841 A | 8/1997 | Storm | |
| 5,705,733 A | 1/1998 | Jannotta | |
| 5,736,865 A | 4/1998 | Nelson et al. | |
| 5,941,122 A | 8/1999 | Nelson et al. | |
| 6,363,785 B1 | 4/2002 | Senghaas et al. | |
| 6,492,911 B1 * | 12/2002 | Netzer | 340/870.37 |
| 6,633,826 B1 | 10/2003 | Schmidt | |
| 6,708,562 B2 | 3/2004 | Krugger et al. | |
| 6,892,590 B1 | 5/2005 | Andermo | |
| 6,898,744 B1 | 5/2005 | Jannotta | |
| 6,899,129 B2 | 5/2005 | Jannotta | |
| 6,992,757 B2 | 1/2006 | Holcomb et al. | |
| 7,021,139 B2 | 4/2006 | Fukuhara et al. | |
| 7,093,485 B2 | 8/2006 | Newman et al. | |
| 7,095,228 B2 | 8/2006 | Steele et al. | |
| 7,222,530 B2 | 5/2007 | Fukuhara et al. | |
| 7,339,245 B2 | 3/2008 | Mueller | |
| 7,376,495 B2 | 5/2008 | Coggins et al. | |
| 7,424,373 B2 | 9/2008 | Mueller et al. | |
| 7,725,273 B2 * | 5/2010 | Jannotta | 702/55 |
| 8,010,312 B2 | 8/2011 | Hocker | |
| 8,069,722 B1 | 12/2011 | Jannotta et al. | |
| 8,195,590 B1 | 6/2012 | Coggins et al. | |
| 2004/0079150 A1 | 4/2004 | Breed et al. | |
| 2004/0182150 A1 | 9/2004 | Okada et al. | |
| 2005/0274915 A1 | 12/2005 | Holcomb et al. | |
| 2006/0142953 A1 | 6/2006 | Mueller et al. | |
| 2006/0169055 A1 | 8/2006 | Agam et al. | |
| 2009/0013798 A1 | 1/2009 | Hocker | |
| 2009/0038405 A1 | 2/2009 | Hocker | |
| 2009/0038406 A1 | 2/2009 | Hocker | |
| 2009/0049925 A1 | 2/2009 | Hocker | |
| 2009/0210077 A1 | 8/2009 | Lefebvre | |
| 2009/0210692 A1 | 8/2009 | Wittmer et al. | |
| 2009/0222699 A1 | 9/2009 | Abbott et al. | |
| 2009/0303090 A1 | 12/2009 | Korn et al. | |
| 2010/0150425 A1 | 6/2010 | Kalteis | |
| 2011/0062942 A1 | 3/2011 | Karbula et al. | |
| 2011/0153259 A1 | 6/2011 | Michael et al. | |

OTHER PUBLICATIONS

Janisch, Josef, "Magnetic Rotary Encoder Training," Jul. 2006, Austriamicrosystems, 29 pp.

Datasheet for AMT203 12 Bit Absolute Encoder, Apr. 2010, CUI, Inc., pp. 1-8.

* cited by examiner

LIQUID LEVEL TRANSMITTER UTILIZING LOW COST, CAPACITIVE, ABSOLUTE ENCODERS

CROSS REFERENCE TO RELATED APPLICATIONS

The present application claims the benefit of similarly titled U.S. provisional patent application No. 61/577,780 filed Dec. 20, 2011 which is incorporated herein by reference in its entirety.

FIELD OF THE EMBODIMENTS

The device described herein can determine the liquid level in a storage tank with high accuracy and reliability and transfer this level data electronically.

BACKGROUND

Existing liquid level transmitter encoders such as those using optical encoders suffer from various drawbacks such as susceptibility to dust and other contaminates, LED failure, and assembly time and cost. Magnetic encoders suffer from resolution degradation that can arise from misalignment between magnets and sensors. The present embodiments seek to provide for an improved liquid level transmission system that overcomes these drawbacks and provides for a reliable, real-time system and process.

SUMMARY

In a first exemplary embodiment described herein, a liquid level monitoring and transmission system includes: a mechanical assembly in communication with the liquid in a container; a dual electronic encoder assembly in communication with the mechanical assembly for determining liquid level including: a first encoder for encoding data indicative of fine level measurements, a second encoder for encoding data indicative of coarse level measurements, at least one processor for controlling operation of the first and second encoders and for processing encoded data therefrom; and a power control system.

In a second exemplary embodiment described herein, a process for acquiring and transmitting liquid level values includes: receiving a request for a liquid level value reading at a processor; requesting by the processor a liquid level value reading from a dual electronic encoder assembly which is in physical communication with a mechanical assembly which is in physical communication with the liquid; encoding by a first encoder data indicative of a fine level measurement of the liquid; encoding by a second encoder data indicative of a coarse level measurement of the liquid; and determining a composite liquid level by the processor using the first encoder data and the second encoder data.

In a third exemplary embodiment described herein, a liquid level monitoring and transmission system includes a host server for requesting and receiving liquid level readings from one or more storage containers. Each of the one or more storage containers has connected thereto: a mechanical assembly in communication with the liquid in the container; a dual electronic encoder assembly in communication with the mechanical assembly for determining liquid level, wherein the dual electronic encoders includes a first encoder for encoding data indicative of fine level measurements and a second encoder for encoding data indicative of coarse level measurements; at least one processor for controlling operation of the first and second encoders and for processing encoded data therefrom; and a power control system for supplying power on and power off commands to the dual encoder assembly.

BRIEF DESCRIPTION OF THE FIGURES

The figures are intended to be read in conjunction with the description provided below.

DETAILED DESCRIPTION

Figure 1:
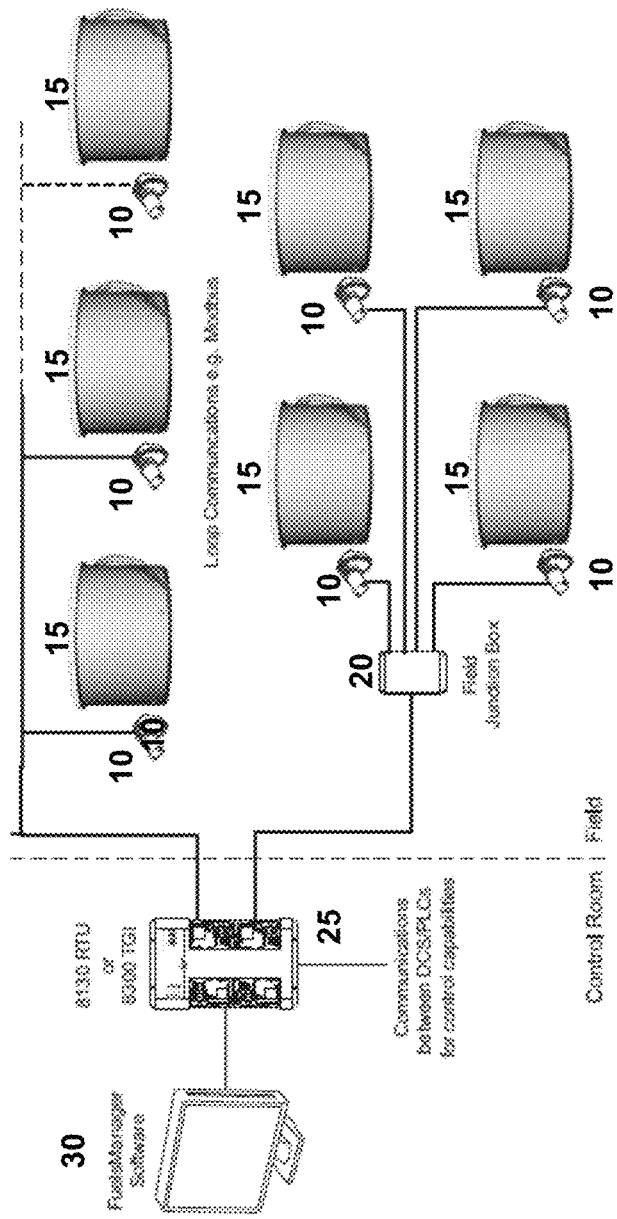
FIG. 1 is a schematic of a prior art tank farm system that may utilize multiple transmitter assemblies as described herein.

The preferred embodiments are directed to a float and tape transmitter which may be mounted to mechanical float and tape tank gauges and is operable to display and/or transmit liquid level and other data to an inventory management system. A prior art system shown in FIG. 1 may include numerous transmitter/gauge combinations (hereafter "transmission gauges") 10 for monitoring level and other data across multiple tanks 15 and communicating level and other data through one or more field junction boxes 20 (if necessary) and through one or more communication modules 25 and appropriate processing software 30. The processing software 30 may include various processing modules located at a Host server, such as FuelsManager Software that is available from Varec, Inc.

Figure 2A:
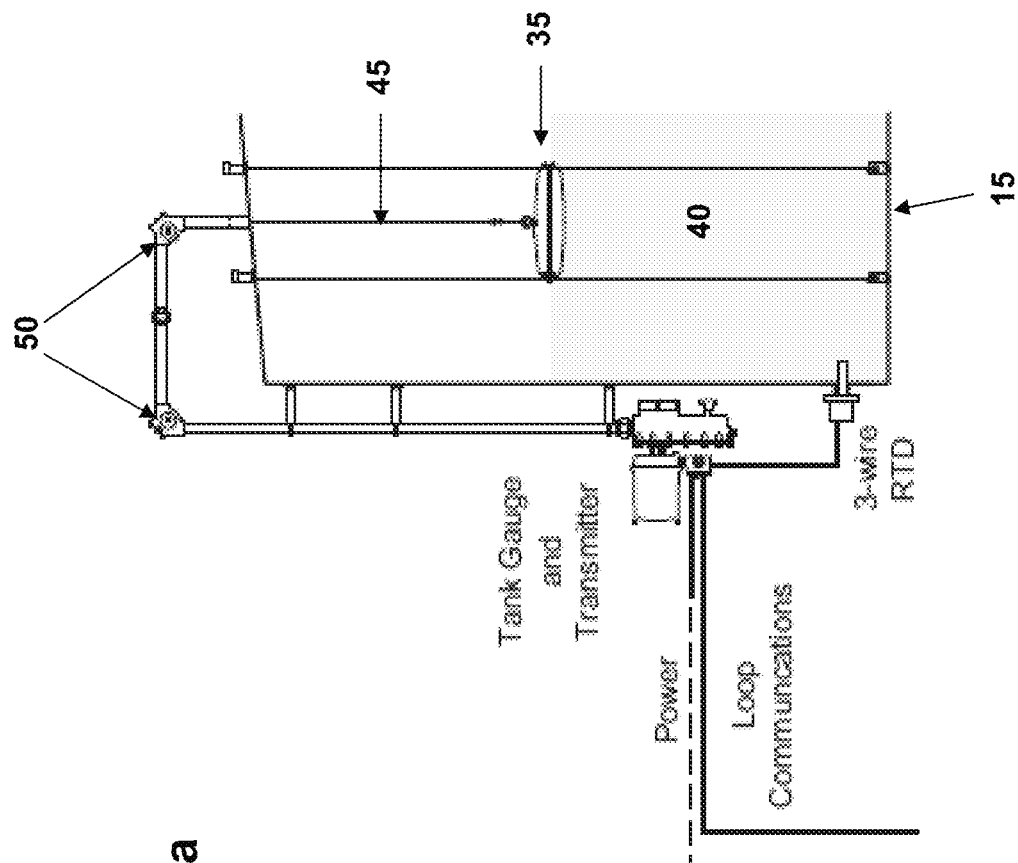
FIGS. 2a and 2b illustrate individual tank and transmitter systems including dual electronic encoders as described herein.
Figure 2B:
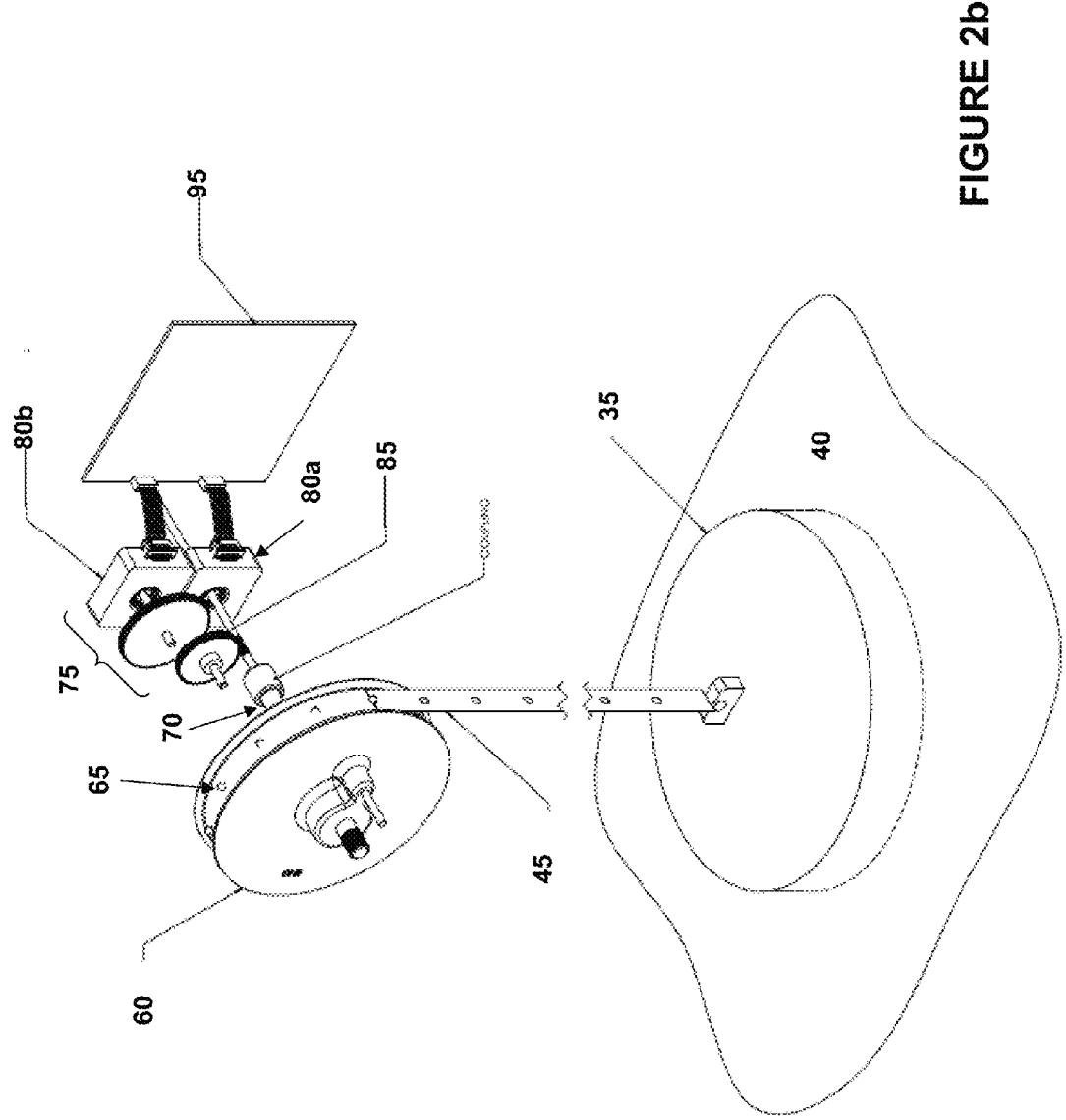

FIGS. 2a and 2b offer more detailed views of a single tank 15 with transmission gauge 10. The liquid level in tank 15 is measured by a mechanical float 35 that rides on the liquid 40 level. A thin metal tape 45 is connected to the float. This tape exits the top of the storage tank and travels over a set of pulleys 50 to a gauge head 55 near the bottom of the tank. The tape is wound onto a drum 60 inside the gauge head. The drum 60 is held in slight tension by a spring motor (not shown). As the liquid level in the tank decreases, the weight of the float overcomes the spring motor and the tape unwinds from the drum. As the liquid level in the tank increases, the float rises with the liquid, and the spring motor winds the tape onto the drum to take up any slack in the tape. The tape is perforated at regulate interval (see FIG. 2b). These perforations engage a sprocket portion 65 of the drum in the gauge head. As the level in the tank changes, the shaft 70 of the drum rotates proportionally. Large changes in level are represented by multiple turns of the sprocket shaft 70, while small changes in level are represented by fractions of a single rotation of the sprocket shaft.

As shown in FIG. 2b, an electronic encoder assembly 75 is coupled to the sprocket shaft 70 to track the position of the shaft and number of turns the shaft has produced. This encoder assembly is comprised of two capacitive encoders (80*a* and 80*b*), a reduction gear train 85, a microcomputer 95, a power control system (not shown), one or more communication interfaces (not shown), associated interconnections (not shown), and associated mounting hardware (not shown). Exemplary capacitive encoders that may be utilized include those described in U.S. Pat. No. 6,892,590 which is incorporated herein by reference in its entirety and currently sold by CUI Incorporated, but are not limited as such. In particular, at the time of filing the present application, CUI's AMT203 absolute capacitance encoder was identified as an exemplary encoder for use in the embodiments described herein. Technical details for the CUI AMT203 are available in the 6 page CUI Inc. specification document for Part Number: AMT203, Description: 12 Bit Absolute Encoder dated December, 2010. Additionally, other encoders and the operation thereof are described in U.S. Pat. Nos. 5,736,865 and 5,941,122 which are incorporated herein by reference. One skilled in the art recognizes the various capacitive encoders that are described in the art and would be useful in the context described herein. A capacitive absolute encoder consists of an alternating current (AC) Field Transmitter, a Rotor, and a Receiver. The rotor is connected to the shaft whose position is being tracked. The rotor rotates with the shaft. The AC field transmitter and the receiver are both stationary. The rotor disk includes a precise metal pattern. The AC field transmitter sends a signal to the rotor. The metal pattern on the rotor creates a modulated signal that is repetitive and predictable based on the rotational position of the rotor. The receiver contains a digital signal processor (DSP) or Application-Specific Integrated Circuit (ASIC) which converts the modulated signal into shaft position information. Functional preference of the absolute capacitance encoder includes accuracy to within 0.1758 degrees. The entire system provides a liquid level accuracy of 1.58 mm.

Further to FIG. 2*b*, the first capacitive encoder 80*a* is coupled directly to the sprocket shaft 70. This first capacitive encoder 80*a* tracks single rotations of the of the sprocket shaft to encode small changes in the in the liquid level. This is considered the fine resolution position. The second capacitive encoder 80*b* is coupled to the sprocket shaft 70 through a reduction gear train 85. This second encoder 80*b* tracks multiple rotations of the sprocket shaft to encode large changes in the liquid level. This is considered the coarse or gross resolution position.

Figure 3A:
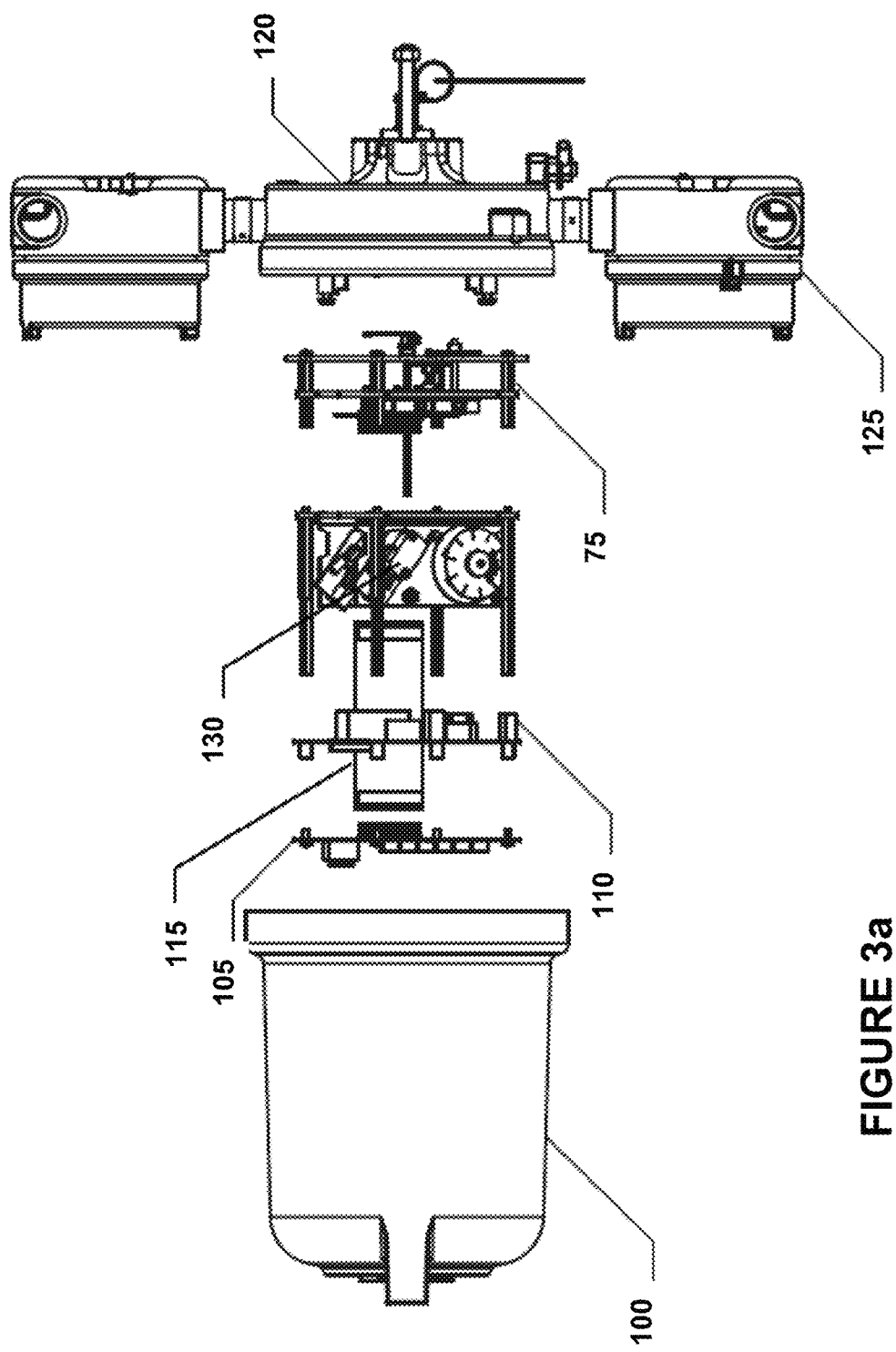
FIGS. 3a through 3c illustrate various detailed views of the transmitter systems including dual electronic encoders as described herein.
Figure 3B:
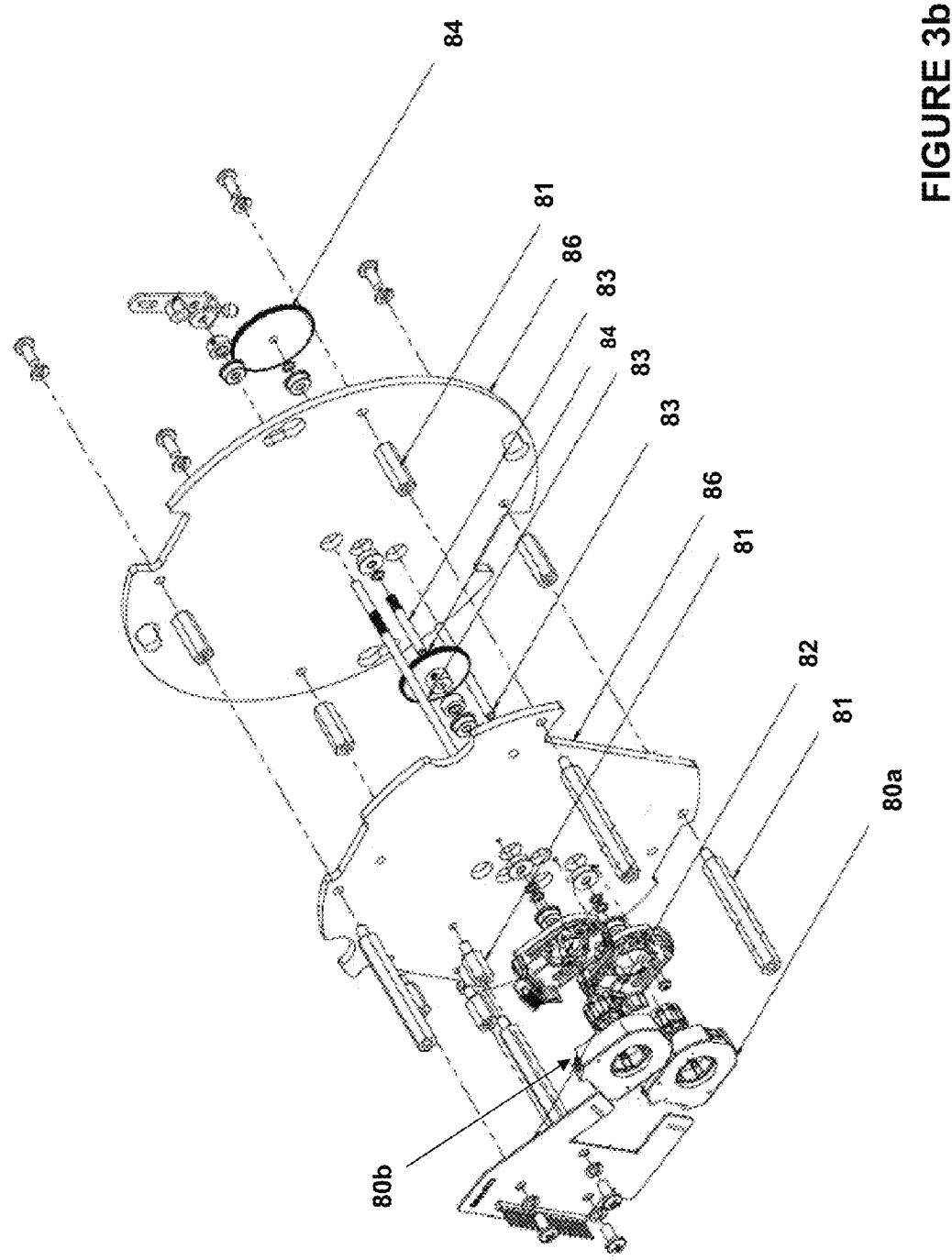
Figure 3C:
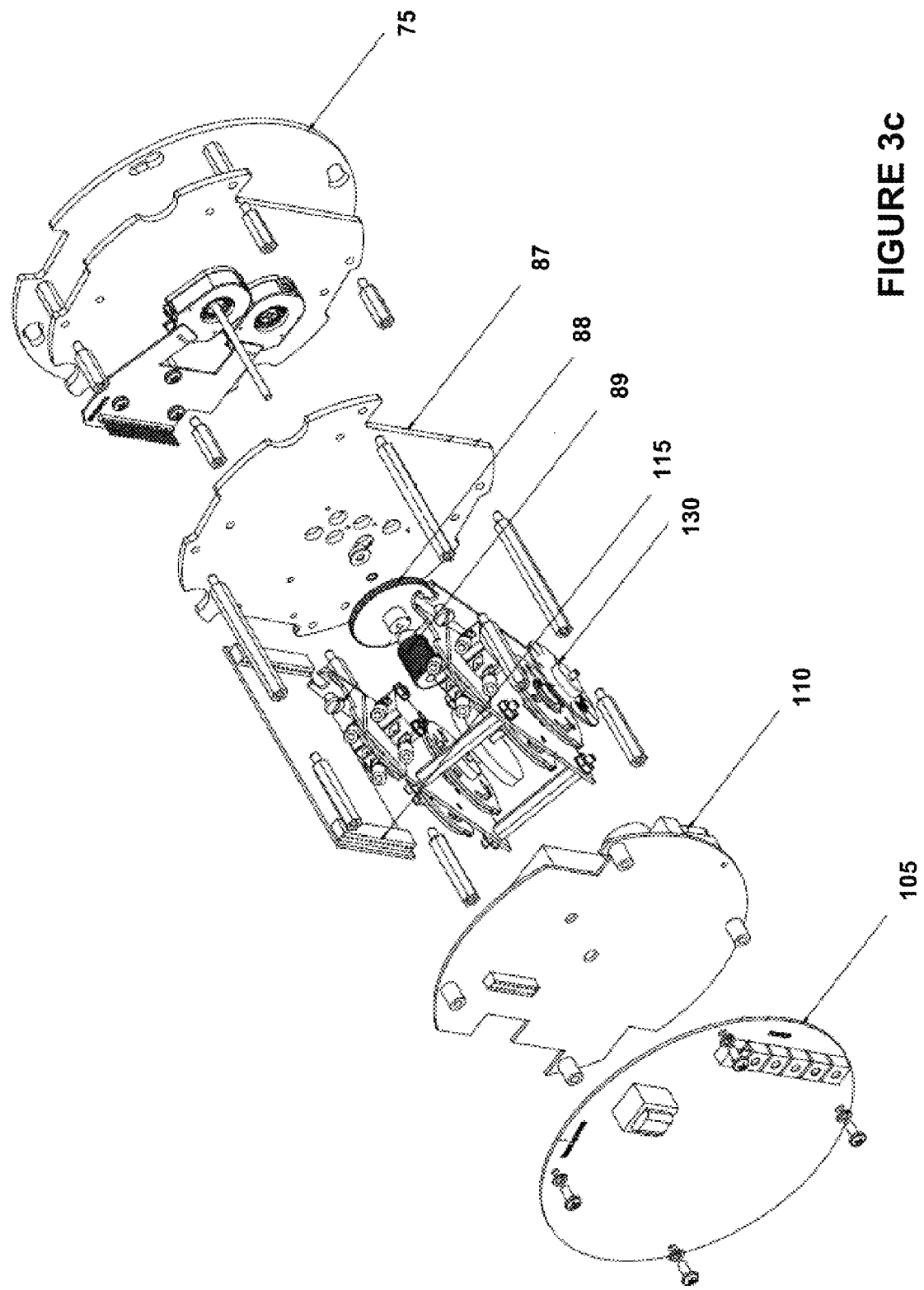

In a particular implementation, the transmitter may include features shown in FIGS. 3*a*-3*c*. Referring to FIG. 3*a*, an exploded system view illustrates: Enclosure Cover 100; Communications Circuit Board 105; AC Power Circuit Board (Optional) 110; Connector Circuit Board 115; Encoder Assembly 75; Enclosure Base 120; Junction Box 125; and Limit Switch Assembly (Optional) 130. Communications Circuit Board 105 includes DC power, field communications, a 3-wire temperature input, and two discrete inputs. The optional AC circuit board 110 contains an AC power supply, two additional discrete inputs, and four contact outputs. The limit switch assembly 130 can support up to four optional limit switches. These limit switches and inputs/outputs can be used in safety applications such as overfill protection, level switch inputs, local alarm control, permissives, and interlocks. The limit switches and inputs/outputs can also provide basic automation control.

FIG. 3*b* illustrates an exploded view of a capacitive encoder assembly 75 including component details. FIG. 3*b* includes, but is not limited to, the encoders 80*a* and 80*b*, various spacers having differing lengths for maintaining separation 81, encoder printed circuit board 82, various shafts 83 for facilitating rotation of gears 84, and mounting plates 86.

FIG. 3*c* illustrates an exploded view of a capacitive encoder with electronics assembly. This illustrates various features which are optional as indicated. The electronics assembly includes, but is clearly not limited to, the encoder assembly 75, limit switch mounting plate 87, field adjustment knob 88, bores 89, connector printed circuit board assembly 115, 4-limit switch assembly 130 (optional), AC printed circuit board assembly 110 (optional) and communications board assembly 105 (e.g., RS485 MODBUS).

Figure 4:
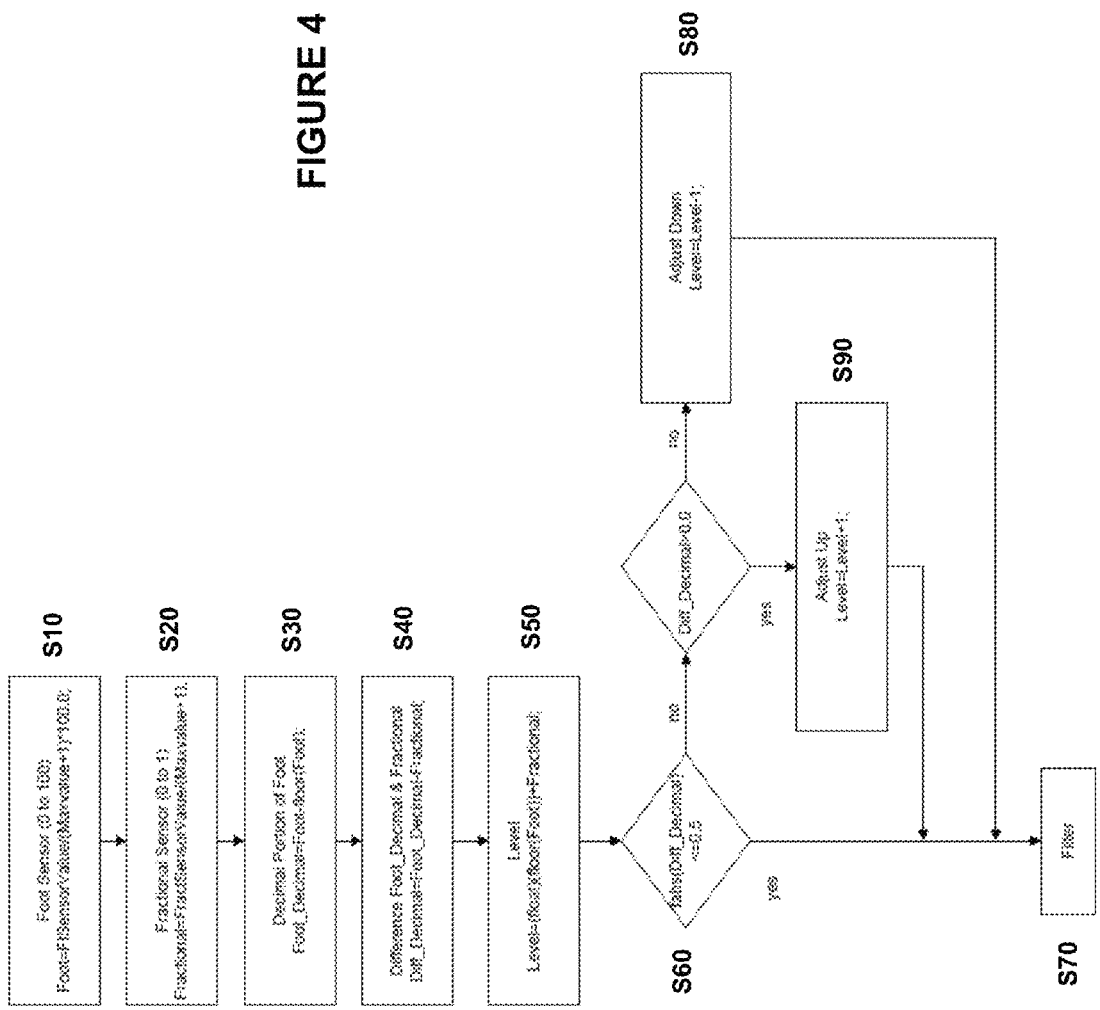
FIG. 4 is a flow chart that is descriptive of a process for combining the coarse and fine encoder position measurements into a composite level in accordance with present embodiments.

The microcomputer 95 interfaces with both capacitive encoders. The microcomputer constructs a composite tank liquid level by obtaining position data from both encoders and combining this coarse and fine position data into a highly accurate liquid level (see FIG. 4 and description below). In order to minimize system power consumption, the microcomputer powers off the encoders when they are not being used to acquire a position measurement. The data acquisition sequence begins when the microcomputer applies power to the fine resolution encoder. After the encoder powers up and stabilizes the specified amount of time, e.g., approximately 100 ms, the microcomputer acquires the position from the encoder one or more times. The microcomputer powers down the fine resolution encoder and then applies power to the coarse resolution encoder. After the encoder powers up and stabilizes the specified amount of time, e.g., approximately 100 ms, the microcomputer acquires the position from the coarse encoder one or more times. The microcomputer powers down the coarse resolution encoder. The microcomputer waits a specified amount of time, e.g., approximately 200 ms, and the sequence is repeated. This allows composite level values to be calculated approximately twice a second (2 Hz). The microcomputer wait time could be increased in the firmware to reduce the power used by the transmitter, but this would correspondingly reduce the update rate.

The microcomputer 95 acts as a master to the digital signal processors, i.e., slave processors, on the individual encoders. The microcomputer 95 coordinates the communication transactions between it and the encoders. The microcomputer 95 is programmed with a protocol whereby when it is either prompted by an outside source, e.g., an outside request is made, or the next pre-programmed time for taking level readings occurs, the microcomputer 95 instructs the first encoder to power on and polls the first encoder to determine if it is ready to provide data. If ready, data is read, encoded and filtered by the microcomputer 95 as described further below. The entire process of power up, polling and power down occurs on the order milliseconds; during which time several readings may be taken.

The microcomputer uses an encoding algorithm to combine the coarse and fine encoder positions into a composite level. The functional steps of the encoding algorithm are set forth in the flow chart of FIG. 4. The position data is acquired from the coarse level encoder. This coarse level encoder may also be referred to as a foot encoder as measurements are initially calculated in feet and converted later in the process if metric units are required. This data is converted into a floating point value using the maximum possible output from the encoder and the maximum possible level of the tank S10. This is the coarse level value (Foot). The position data is acquired from the fractional foot encoder. This data is converted into a floating point value using the maximum possible output from the encoder S20. This is the fine level value (Fractional). The decimal portion of the coarse level is saved for comparison with the fine level value (Foot_Decimal) S30. The difference between the fine level value and the decimal portion of the coarse level is calculated (Diff_Decimal) S40. A composite level value (Level) is constructed using the integer portion of the coarse level and the fine level value as the decimal portion S50. The difference between the fine level value and the decimal portion of the coarse level (Diff_Decimal) is tested S60. If this value is greater than or equal to −0.5 and less than or equal to 0.5, then both encoders are synchronized and the composite level is valid S70. If this value is greater than 0.5, the coarse level has transitioned before the fine level and the composite level (Level) is adjusted down S80. If this value is less than −0.5, the fine level has transitioned before the coarse level and the composite level (Level) is adjusted up S90. This encoding algorithm is vital since the fine resolution encoder produces a large discontinuous position change as the encoder "wraps around" from 0 to the maximum value or from the maximum value to 0 after each full rotation of the sprocket shaft.

The microcomputer calculates approximately two composite level values per second. If these values do not contain any acquisition or calculation errors, level updates are available at up to two per second. If composite level errors occur, the level update rate is reduced. The Host server (see FIG. 1) interrogates (polls or pulls data from) one or more transmission gauges periodically to obtain level, temperature, and other data. The Host server typically interrogates the transmission gauge two or three times a minute. For fastest example, a Host server may interrogate the transmission gauge every three to five seconds. In a very large installation, or a wireless application the transmission gauge may be interrogated every few minutes. The system configuration determines how often data is being pulled from the transmission gauge.

Figure 5:
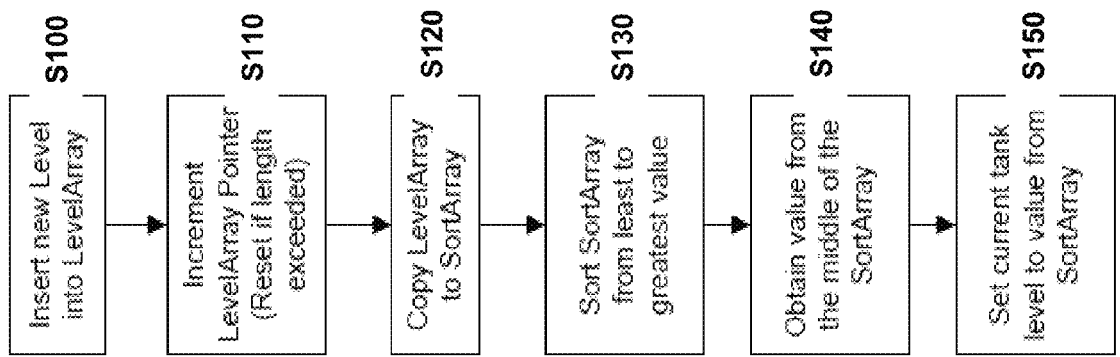
FIG. 5 is a flow chart that is descriptive of a method for processing successive composite level values in accordance with present embodiments.

The microcomputer uses a filter algorithm to process successive composite level values. The functional steps of the filter algorithm are set forth in the flow chart of FIG. 5. A new level value is inserted into an array at the pointer location S100. The array pointer is incremented and reset to the beginning if the array end is exceeded S110. The array is copied to a temporary sorting array S120. The sorting array is sorted from least to greatest value S130. The current level value is derived from the value in the middle of the array S140 and the tank level is set to this value S150. This technique is applicable to values which are typically only changing by small amounts, e.g., fractions of inches per minute. This technique filters any large changes in the value which are usually acquisition or calculation errors. This technique eliminates any artifacts from the level values caused by acquisition or calculation errors. These artifacts are inherent when averaging samples or when using other filtering approaches.

More particularly, in a storage tank (even a small one) the liquid level does not change very quickly. As the tank is filled or emptied, the level is only changing by fractions of an inch per minute (maybe changing by inches per minute in a small tank). If the transmission gauge produces (measurement+calculation) a new level value which is significantly larger than previous levels, an error has probably occurred and the value should not be used as a level value. The sort filter described herein works well here because the level of the tank is changing slowly. The sort filter works as a list of recent level values are maintained and sorted from least to greatest. The first values in the list are most likely going to be low level errors (if any exist). The data at the end of the list will be the large level errors (if any exist). The current level is selected from the middle of the sorted list. When the next composite level value is available, the oldest composite level is discarded and the composite levels are sorted again. The process repeats. If there are no level errors, new level changes are delayed by the time required for all values to propagate through the list. By way of specific example, a sorted list is currently 5 samples (values) and new data is available at 2 Hz, so the delay from measured to transmitted level can be as high as 2.5 seconds (time lag). This is acceptable for storage tank level applications. Accordingly, the sorting process minimizes the chances of any "jumps" in level calculations.

The microcomputer next converts the liquid level into level units determined by the configuration of the device. In a preferred embodiment, the microcomputer communicates the level data over one or more communication interfaces using the communication protocol determined by the configuration of the device.

In verification testing, it has been determined that the float and tape transmitter with dual absolute electronic encoders as described herein exhibit improved measurement accuracy over existing transmitters with magnetic encoders. The periodic level error exhibited by magnetic encoders is directly related to misalignment between the rotational center of the magnet and the center on the Hall Effect sensor integrated circuit. Whereas the accuracy of the capacitive encoder is not dependent on alignment between the shaft and the sensor.

Various background concepts related to the systems and methods of the present embodiments are described in commonly assigned U.S. Pat. No. 6,992,757 entitled Method and System for Encoding Fluid Level and the Varec 2900 optical Float and Tape Transmitter Installations and Operations Manual (Document code IOM012GVAE1110; copyright 2006) both of which are incorporated herein by reference in its entirety.

One skilled in the art recognizes features of the embodiments herein that are inherent or depicted in the Figures, though not specifically described in text. Additionally, one skilled in the art recognizes that there are individual component arrangements and substitutions that may not be explicitly described herein, but are well within the scope of the invention.

The invention claimed is:

1. A liquid level monitoring and transmission system comprising:
   a mechanical assembly including at least a sprocket shaft and a reduction gear train in communication with the liquid in a container;
   a dual electronic absolute capacitive encoder assembly in communication with the mechanical assembly for determining a composite liquid level in the container, the dual electronic absolute encoder assembly including:
   a first absolute capacitive encoder directly coupled to the sprocket shaft to track single rotations of the sprocket shaft for encoding data indicative of fine level measurements,
   a second absolute capacitive encoder indirectly coupled to the sprocket shaft through the reduction gear train to track multiple rotations of the sprocket shaft for encoding data indicative of coarse level measurements,
   at least one processor programmed with an encoding algorithm and a filter algorithm for controlling operation of the first and second encoders and for processing encoded data therefrom to calculate the composite liquid level in the container approximately every 2 Hz, wherein the filter algorithm applies a sorting filter to successive calculated composite liquid levels to eliminate values caused by acquisition and calculation errors; and a power control system for minimizing power consumption of the system by separately controlling power to each of the first and second encoders responsive to instructions from the at least one processor, wherein the first and second encoders are powered sequentially such that the first encoder is powered down prior to the second encoder being powered up, and further wherein the at least one processor receives multiple readings from each of the first and second encoders during a respective time when each of the first and second encoders is powered up.

2. The system of claim 1, wherein the mechanical assembly includes a float and tape assembly.

3. The system of claim 1, further comprising at least one communication assembly for facilitating transmission of the determined liquid level to another location.

4. A process for controlling the system of claim 1 comprising:

powering on the first absolute capacitive encoder responsive to instructions from the power control system and obtaining multiple fine level measurements therefrom, wherein a time period for powering up the first absolute capacitive encoder and obtaining multiple fine level measurements is approximately 100 ms;

powering down the first absolute capacitive encoder responsive to instructions from the power control system;

powering on the second absolute capacitive encoder responsive to instructions from the power control system and obtaining multiple coarse level measurements therefrom, wherein a time period for powering up the first absolute capacitive encoder and obtaining multiple coarse level measurements is approximately 100 ms;

powering down the second absolute capacitive encoder responsive to instructions from the power control system; and determining multiple composite liquid level readings by the at least one processor using the multiple fine level measurements and the multiple coarse level measurements and applying a filter algorithm to sort successive calculated composite liquid level readings to eliminate values caused by acquisition and calculation errors.

5. The process according to claim 4, wherein determining the multiple composite liquid level readings comprises:

acquiring at the at least one processor coarse position data from the second absolute capacitive encoder;

converting the coarse position data into a coarse floating point value using a maximum possible output from the second absolute capacitive encoder and a maximum possible level of the container;

acquiring at the at least one processor fine position data from the first absolute capacitive encoder;

converting at the at least one processer the fine position data into a fine floating point;

converting at the at least one processer the fine position data into a fine floating point value using a maximum possible output from the first absolute capacitive encoder;

calculating at the at least one processer a difference (Diff_Decimal) between a decimal portion of the coarse floating point value and the fine floating point value;

constructing at the at least one processer the composite liquid level value using an integer portion of the coarse floating point value for an integer portion of the composite liquid level value and using the fine floating point value for a decimal portion of the composite liquid level value; and validating at the at least one processer the constructed composite liquid level value using Diff_Decimal.

6. The process according to claim 5, wherein validating the constructed composite liquid level value using Diff_Decimal comprises:

determining at the at least one processor if Diff_Decimal is greater than or equal to −0.5 and less than or equal to 0.5 and if determined, confirming that the constructed composite level value is valid;

if not determined, determining if Diff_Decimal is greater than 0.5 and if determined, adjusting the constructed composite liquid level value down; and if not determined, determining if Diff_Decimal is less than −0.5 and adjusting the constructed composite liquid level value up.

7. The process according to claim 6, further comprising:

adding by the at least one processor the constructed composite liquid level value as a next value in an array having X number of values;

copying by the at least one processor the array to a sorting array;

sorting by the at least one processor the sorting array from least to greatest value;

deriving by the at least one processor a current liquid level from a middle value; and transmitting by a communication module operating in conjunction with the at least one processor the derived current liquid level to another location.

8. The process according to claim 7, wherein X equals 5.

9. The process according to claim 4, wherein composite liquid level values are generated at an approximate rate of two per second.

10. A process for acquiring and transmitting liquid level values comprising:

receiving a request for a liquid level value reading at a processor;

requesting by the processor a liquid level value reading from a dual electronic absolute capacitive encoder assembly which is in physical communication with a mechanical assembly including at least a sprocket shaft and a reduction gear train which is in physical communication with the liquid;

powering up a first absolute capacitive encoder responsive to instructions from a power control system, wherein a time period for powering up the first absolute capacitive encoder is approximately 100 ms;

encoding by a first absolute capacitive encoder directly coupled to the sprocket shaft data indicative of a fine level measurement of the liquid;

providing, to the processor, by the first absolute capacitive encoder the data indicative of a fine level measurement of the liquid, wherein the first absolute capacitive encoder provides multiple readings of data indicative of a fine level measurement of the liquid while powered up;

powering down the first absolute capacitive encoder responsive to instructions from the power control system;

powering up a second absolute capacitive encoder responsive to instructions from the power control system;

encoding by a second absolute capacitive encoder indirectly coupled to the sprocket shaft through the reduction gear train data indicative of a coarse level measurement of the liquid;

providing, to the processor, by the second absolute capacitive encoder the data indicative of a course level measurement of the liquid, wherein the second absolute capacitive encoder provides multiple readings of data indicative of a coarse level measurement of the liquid while powered up, wherein a time period for powering up the second absolute capacitive encoder is approximately 100 ms;

powering down the second absolute capacitive encoder responsive to instructions from the power control system; and determining multiple composite liquid level readings by the processor using the first absolute capacitive encoder data and the second absolute capacitive encoder data and applying a filter algorithm to sort successive determined composite liquid level readings to eliminate values caused by acquisition and calculation errors.

11. The process according to claim 10, wherein determining the multiple composite liquid level readings comprises:

converting by the processor the second absolute capacitive encoder data into a coarse floating point value using a maximum possible output from the second absolute capacitive encoder and a maximum possible level of a container storing the liquid;

converting by the processor the first absolute capacitive encoder data into a fine floating point value using a maximum possible output from the first absolute capacitive encoder;

calculating by the processer a difference (Diff_Decimal) between a decimal portion of the coarse floating point value and the fine floating point value;

constructing by the processer the composite liquid level value using an integer portion of the coarse floating point value for an integer portion of the composite liquid level value and using the fine floating point value for a decimal portion of the composite liquid level value; and validating at the at least one processer the constructed composite liquid level value using Diff_Decimal.

12. The process according to claim 11, wherein validating the constructed composite liquid level value using Diff_Decimal comprises:

determining by the processer if Diff_Decimal is greater than or equal to −0.5 and less than or equal to 0.5 and if determined, confirming that the constructed composite level value is valid;

if not determined, determining if Diff_Decimal is greater than 0.5 and if determined, adjusting the constructed composite liquid level value down; and if not determined, determining if Diff_Decimal is less than −0.5 and adjusting the constructed composite liquid level value up.

13. The process according to claim 12, further comprising:

adding by the processor the constructed composite liquid level value as a next value in an array having X number of values;

copying by the processor the array to a sorting array;

sorting by the processor the sorting array from least to greatest value;

deriving by the processor a current liquid level from a middle value; and transmitting by a communication module operating in conjunction with the processor the derived current liquid level to another location.

14. The process according to claim 13, wherein X equals 5.

15. The process according to claim 10, wherein composite liquid level values are generated at an approximate rate of two per second.

16. A liquid level monitoring and transmission system comprising:

a host server for requesting and receiving composite liquid level readings from one or more storage containers, wherein each of the one or more storage containers has connected thereto:

a mechanical assembly including at least a sprocket shaft and a reduction gear train in communication with the liquid in the container;

a dual electronic absolute capacitive encoder assembly in communication with the mechanical assembly for determining composite liquid level readings, wherein the dual electronic absolute capacitive encoder includes a first absolute capacitive encoder directly coupled to the sprocket shaft for encoding data indicative of fine level measurements and a second absolute capacitive encoder indirectly coupled to the sprocket shaft through the reduction gear train for encoding data indicative of coarse level measurements;

at least one processor programmed with an encoding algorithm and a filter algorithm for controlling operation of the first and second absolute capacitive encoders and for processing encoded data therefrom to determine the composite liquid level in the container approximately every 2 Hz, wherein the filter algorithm applies a sorting filter to successive determined composite liquid level readings to eliminate values caused by acquisition and calculation errors; and a power control system for supplying power on and power off commands to each of the first and second absolute capacitive encoders of the dual encoder assembly to minimize power consumption of the system, wherein the first and second encoders are powered sequentially such that the first encoder is powered down prior to the second encoder being powered and further wherein the at least one processor receives multiple readings from each of the first and second encoders during a respective time when each of the first and second encoders is powered up.

17. The system of claim 16, wherein the mechanical assembly includes a float and tape assembly.

18. The system of claim 16, further comprising at least one communication assembly at each storage container for facilitating transmission of the requests and responses to and from the host server and the at least one processor.

* * * * *